(12) United States Patent
Somerfield

(10) Patent No.: US 11,725,714 B2
(45) Date of Patent: Aug. 15, 2023

(54) BALLSCREW SEAL

(71) Applicant: Goodrich Actuation Systems Limited, Solihull (GB)

(72) Inventor: Michael Somerfield, Stoke-on-Trent (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 105 days.

(21) Appl. No.: 16/999,617

(22) Filed: Aug. 21, 2020

(65) Prior Publication Data

US 2021/0131539 A1   May 6, 2021

(30) Foreign Application Priority Data

Aug. 23, 2019  (EP) ..................................... 19193494

(51) Int. Cl.
*F16H 25/24* (2006.01)
*F16H 25/22* (2006.01)
*F16J 15/3204* (2016.01)

(52) U.S. Cl.
CPC ..... *F16H 25/2418* (2013.01); *F16H 25/2214* (2013.01); *F16J 15/3204* (2013.01)

(58) Field of Classification Search
CPC .......... F16J 15/00; F16J 15/32; F16J 15/3204; F16J 15/3208; F16J 15/3212; F16H 25/00; F16H 25/24; F16H 25/2418; F16H 25/22; F16H 25/2214; F16H 25/2219; F16H 25/2223; F16H 25/2228
USPC .......................................................... 277/354
See application file for complete search history.

(56) References Cited

U.S. PATENT DOCUMENTS

| 3,646,827 | A |   | 3/1972 | Paiierson |
| 3,669,460 | A |   | 6/1972 | Wysong |
| 4,052,076 | A |   | 10/1977 | Wysong |
| 4,905,533 | A | * | 3/1990 | Benton ............... F16H 25/2418 |
|           |   |   |        | 277/354 |
| 5,799,953 | A |   | 9/1998 | Henderson |
| 9,388,890 | B2 | * | 7/2016 | Garrett ................ F16H 25/2418 |

(Continued)

FOREIGN PATENT DOCUMENTS

DE          41 27 300       *   2/1993   ............. F16J 15/164

OTHER PUBLICATIONS

European Search Report for Application No. 19193494.2, dated Dec. 13, 2019, 7 pages.

(Continued)

*Primary Examiner* — Nathan Cumar
(74) *Attorney, Agent, or Firm* — Cantor Colburn LLP

(57) ABSTRACT

A ballscrew assembly includes a nut having a first helical groove formed on a radially inner surface and defining an axis, a screw disposed along the axis (X) and within the nut and that includes a second helical groove formed on a radially outer surface and opposed to the first helical groove so as to form a helical raceway. The assembly also includes a plurality of balls disposed in the helical raceway and an annular seal disposed radially between the nut and the screw. The seal includes a resilient body and a layer formed of PTFE and disposed radially between the resilient body and the screw and configured to contact the radially outer surface of the screw. An optional annular scraper is disposed axially adjacent to the seal and is configured to receive fluid at one axial end and expel fluid at a second axial end.

13 Claims, 2 Drawing Sheets

(56) References Cited

U.S. PATENT DOCUMENTS

| | | |
|---|---|---|
| 9,810,298 B2 | 11/2017 | Gianfranceschi |
| 2005/0087029 A1 | 4/2005 | Perni et al. |
| 2014/0190287 A1 | 7/2014 | Garrett et al. |
| 2014/0361494 A1 | 12/2014 | Lenhert |
| 2017/0030446 A1 | 2/2017 | Oka et al. |
| 2017/0045143 A1 | 2/2017 | Brewer et al. |
| 2018/0306287 A1 | 10/2018 | Davies |
| 2019/0063571 A1 | 2/2019 | Holding et al. |
| 2019/0154151 A1* | 5/2019 | Arikawa ............ F15B 15/1452 |

OTHER PUBLICATIONS

European Office Action for EP Application No. 19193494.2, dated Mar. 1, 2023, pp. 1-8.

* cited by examiner

BALLSCREW SEAL

FOREIGN PRIORITY

This application claims priority to European Patent Application No. 19193494.2 filed Aug. 23, 2019, the entire contents of which is incorporated herein by reference.

TECHNICAL FIELD

The present disclosure relates generally to ballscrew assemblies, and more specifically to various aspects and embodiments of a seal for a ballscrew assembly. The seal is configured to move with a nut of the ballscrew assembly and is configured to limit leakage of lubricant from the ballscrew, whilst limiting water ingress into the ballscrew as the nut moves in use.

BACKGROUND

Ballscrew assemblies are used to translate a rotational input into an axial displacement with minimal friction losses. Ballscrew assemblies can include an actuator and may be used in a variety of applications, including in aircraft and aircraft engines.

Ballscrew actuators are generally lubricated in order to facilitate relative motion between the ballscrew components, including a screw rotatable about an axis, a nut that moves axially relative to the screw and ball bearings located between the working surfaces (e.g., helical grooves) of the nut and screw. The majority of the lubricant is located in the space between the nut and the screw to facilitate movement of the ball bearings. In use lubricant will leak from this space, and it is necessary to reapply lubricant thereto in order to maintain an acceptable amount of lubrication. As such, it is desirable to seal the ballscrew in such a way as to try to prevent lubricant leaking from this space. This helps to maximise the time period between reapplications of the lubricant. Sealing is also desirable to limit ingress of water or other contaminants from outside of the ballscrew, which harm the function of the ballscrew by interfering with lubrication.

This can be a particular concern for ballscrew assemblies that are used in connection with an aircraft, for example for a flight control surface or thrust reverser actuation system ("TRAS"). For example, a TRAS will deploy upon landing, and in doing so will expose the actuator of the ballscrew assembly to high amounts of moisture. This can be due to, e.g., water on the runway due to rain, or condensation due to landing in hot and/or humid conditions (after a long period of flight at high altitude the actuator will be very cold). Upon stowing the TRAS after landing, the water that is present on the actuator has a tendency to be pulled into the ballscrew and contaminate the lubricant.

Effective sealing of a ballscrew actuator is difficult to achieve. Seals which successfully limit lubricant leakage and water ingress often generate too much friction between the screw and the nut, binding the actuator and preventing proper functioning thereof. For example, seals made primarily of relatively rigid materials and energised by spring members have to be designed with large clearances from the screw and nut in order to avoid frictional binding. These clearances result in ineffective sealing.

It is desired, therefore, to limit lubricant leakage from and water ingress into a ballscrew, whilst also limiting frictional forces between the various components thereof.

SUMMARY

According to a first aspect of the present disclosure, there is provided a ballscrew assembly comprising a nut having a first helical groove formed on a radially inner surface and defining an axis, a screw disposed along the axis and within the nut, the screw comprising a second helical groove formed on a radially outer surface and opposed to the first helical groove so as to form a helical raceway, a plurality of balls disposed in the helical raceway. An annular seal is disposed radially between the nut and the screw, the seal comprising a resilient body (which could be referred to as a body made from a resilient and/or compliant material), and a layer formed of PTFE and disposed radially between the resilient body and the screw and configured to contact the radially outer surface of the screw. An annular scraper is disposed axially adjacent to the seal, the scraper configured to receive fluid at one axial end and expel fluid at a second axial end.

In an embodiment, the resilient body is formed of an elastomeric and/or compliant material.

In a further embodiment according to any of the foregoing embodiments, the ballscrew assembly further comprises a casing positioned between the resilient body and the nut, wherein the casing is formed from a different material to the resilient body.

In a further embodiment according to any of the foregoing embodiments, the casing is formed of stainless steel.

In a further embodiment according to any of the foregoing embodiments, the seal further comprises a lip which directly contacts the screw at the second helical groove.

In a further embodiment according to any of the foregoing embodiments, the lip is contiguous with the resilient body.

In a further embodiment according to any of the foregoing embodiments, the lip contacts the helical groove along less than half of an axial pitch of the groove.

In a further embodiment according to any of the foregoing embodiments, the lip contacts the helical groove along less than a third of an axial pitch of the groove.

In a further embodiment according to any of the foregoing embodiments, the scraper comprises a plurality of slots angled relative to the axis and configured to lift and guide fluid out of the second helical groove.

In a further embodiment according to any of the foregoing embodiments, the slots form a generally helical shape.

In a further embodiment according to any of the foregoing embodiments, the nut further comprises one or more passages having an opening at the radially inner surface, the scraper arranged adjacent to the opening and configured such that fluid guided from the second helical groove by the slots enters the one or more passages to be expelled from the ballscrew assembly.

According to a further aspect of the present invention, there is provided an actuator for an aircraft engine thrust reverser, the actuator comprising the ballscrew assembly of any of the foregoing embodiments.

According to a further aspect of the present invention, there is provided an aircraft engine comprising a thrust reverser according to the foregoing embodiment.

According to a further aspect of the present invention, there is provided a seal assembly for a ballscrew assembly, the seal assembly comprising an annular seal, the seal comprising a resilient body, a layer formed of PTFE and disposed on one side of the resilient body, and a casing disposed on an opposing side of the resilient body, wherein the casing is formed from a different material to the resilient body. The seal assembly optionally further comprises an annular scraper disposed axially adjacent to the seal, the scraper configured to receive fluid at one axial end and expel fluid at a second axial end.

According to a further aspect of the present invention, there is provided a method of manufacturing the seal assembly of the foregoing embodiment, the method comprising molding the layer on the resilient body, press fitting the resilient body into the casing, and providing the scraper and positioning this adjacent to (e.g., immediately next to, without any further components between) the resilient body and/or the casing.

DETAILED DESCRIPTION OF THE FIGURES

Various embodiments of a ballscrew assembly will be described herein, which may form part of an actuator. The actuator may be for an aircraft, such as an actuator for a flight control surface or a thrust reverser actuation system. Aspects of the disclosure include an aircraft comprising the actuator and/or ballscrew assembly, which may be configured to actuate a flight control surface or a thrust reverser actuation system. However, the broadest aspects of the present disclosure relate to a seal assembly for a ballscrew, which is advantageous in its own right and may be claimed independently.

As will be described in more detail below, the seal assembly is configured to move with a nut of the ballscrew, and is particularly suitable for use with a flight control surface or thrust reverser actuation system ("TRAS"), since the disclosed seal assembly can help limit leakage of lubricant from the ballscrew, whilst limiting water ingress into the ballscrew as the nut moves in use.

Figure 1:
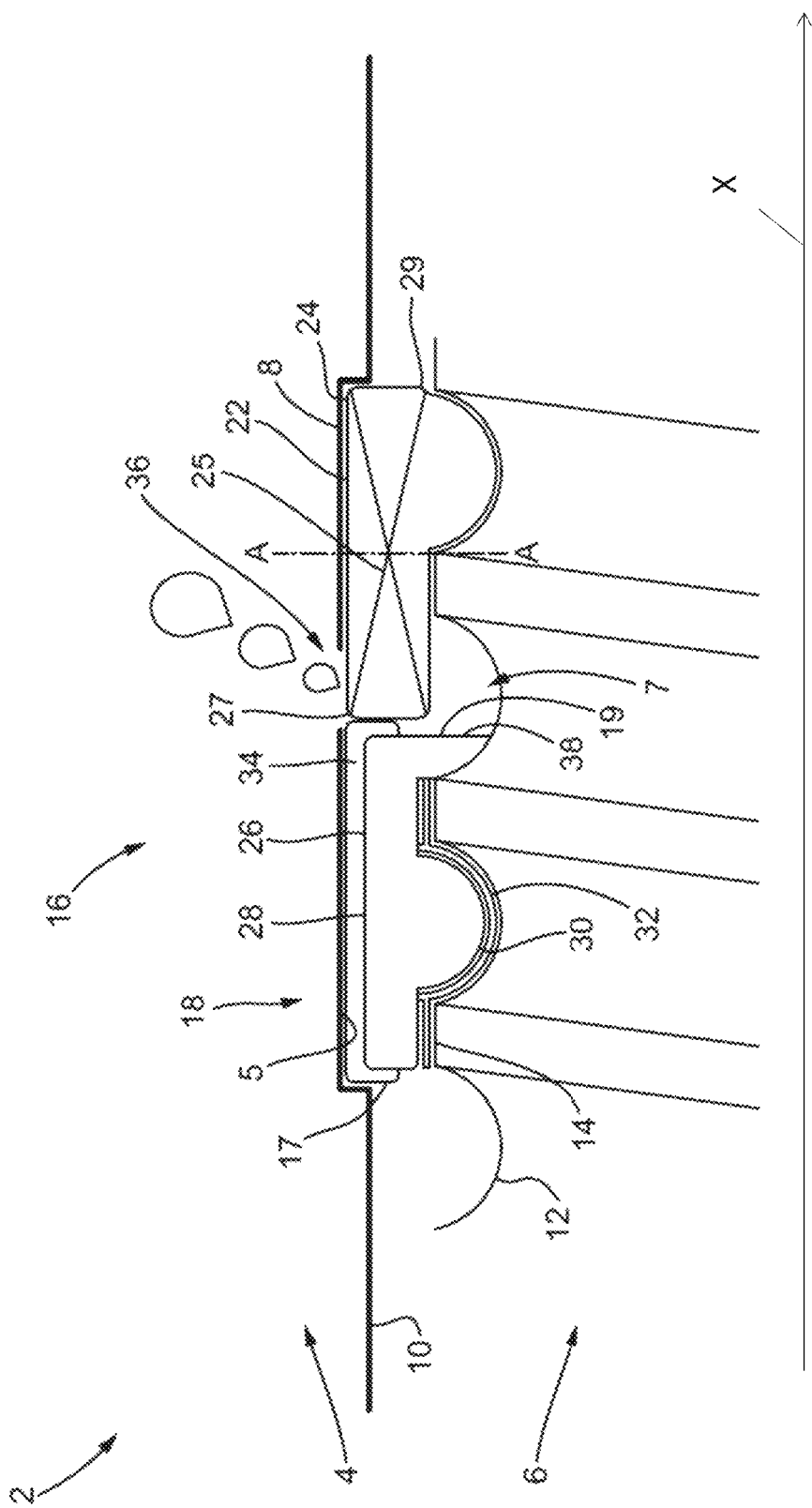
FIG. 1 shows a partial sectional view of a ballscrew assembly in accordance with one embodiment.

FIG. 1 schematically shows a partial sectional view of a ballscrew assembly 2 according to an embodiment. The ballscrew assembly 2 comprises a nut 4, a screw 6 and a plurality of balls (e.g., ball bearings; not shown). The nut 4 includes a helical groove (not shown) formed on a radially inner surface 10 thereof, and the screw 6 includes a corresponding opposed helical groove 12 formed on a radially outer surface 14 thereof. The screw 6 is disposed within the nut 4, and as is typical the balls sit between the screw 6 and the nut 4, in the respective helical grooves. The screw 6 can rotate within the nut 4, which causes the screw 6 and the nut 4 to move relative to one another along a shared axis X.

The screw 4, the nut 6 and the plurality of balls are lubricated to facilitate this movement. The ballscrew assembly 2 may use any suitable lubricant known in the art, in particular an oil lubricant or a grease lubricant.

The ballscrew assembly 2 comprises an outboard end, positioned towards the intended direction of actuation and closest to an external environment, and an inboard end, positioned away from the intended direction of actuation and furthest from the external environment.

The ballscrew assembly 2 comprises a seal assembly 16 disposed between the nut 4 and the screw 6. The seal assembly 16 is arranged at a section of the nut 4 which does not comprise a helical groove, and instead forms a recessed portion 5 with a corresponding space 7 between the radially inner surface 10 of the nut 4 and the radially outer surface 14 of the screw 6. The recessed portion 5 and corresponding space 7 are shaped to receive the seal assembly 16.

The seal assembly 16 comprises an inboard end 17 and an outboard end 19 which is closes to an outboard end of the ballscrew assembly. The seal assembly 16 comprises a seal 18, which is located at the outboard end of the ballscrew assembly 2.

The seal 18 is annular, extending circumferentially around the screw 6 for at least one full turn (360°). The seal 18 comprises a resilient and/or compliant body 26. In one embodiment, the resilient body 26 comprises an elastomer. The body 26 comprises a first, base section 28 which may be generally rectangular in cross section and is arranged partially in the gap 7. The body 26 also comprises a second section 30, which is contiguous with the first section 28, and is disposed in and shaped to fit within the helical groove 12 of the screw 6. The second section 30 may follow the same contour as the helical groove 12 of the screw 6, for example the second section 30 may be substantially hemi-cylindrical.

The seal 18 further comprises a cap or layer 32, which is arranged between the body 26 and the helical groove 12 and may be configured to prevent contact between at least the second section 30 of the body 26 and the helical groove 12 of the screw 6. The layer 32 separates the body 26 and the screw 6, wherein the layer may extend fully over the second section 30 and at least partially over the first section 28. The layer 32 may at least extend over the second section 30 of the body 26. The layer 32 may be formed of a material which has a lower coefficient of friction (and/or is more rigid) than the resilient material of the body 26, so as to generate less friction when in contact with the screw 6. In one embodiment, the material of the body 26 may have a coefficient of friction that is at least half that of the material of the layer 32. The material of the body 26 may comprise polytetrafluoroethylene ("PTFE").

The resilient material of the body 26 biases the layer 32 in a direction towards the screw 6, so as to energise the layer 32 into contact with the screw 6. The seal 18 thereby provides sealing contact between the nut 4 and the screw 6 than would be achieved by direct contact of the body 26 with the screw 6. The layer 32 reduces the coefficient of friction between the screw 6 and the seal 18 as compared to the body 26 alone, whilst allowing use of a highly elastomeric (but high friction) resilient material for the body 26. As such, the combination of resilient body 26 and layer 32 provides an effective sealing contact while avoiding binding of the ballscrew assembly due to friction. The layer 32 also limits damage to and wear of the body 26. The combination of the resilient or compliant body 26 and layer 32 means that the large clearance (referred to in the background section above) can be substantially eliminated, and the layer 32 is able to contact a much larger surface area of the screw 6 in use.

In various embodiments, the seal further comprises a casing 34, which may be disposed between the body 26 and the nut 4 at the recessed portion 5. The casing 34 may cover a radially outer side of the first section 28 so that the body 26 does not contact the nut 4. The resilient material of the seal body 26 may be biased between the casing 34 and the layer 32, such that the resilient body 26 energises the casing 34 into contact with the nut 4. The casing 34 helps to protect the body 26 from damage and wear which might occur due to direct contact with the nut 4. To provide adequate protection, the casing 34 may be formed of a material such as stainless steel. In various embodiments body 26 is press fit into the casing 34.

Even where an effective seal is provided, some amount of water can still enter the ballscrew assembly, especially when environmental conditions are particularly adverse and large amounts of water build up near the seal. As such, it is desirable to prevent water from building up at the outboard end of the seal, so as to reduce the water repulsion requirement of the seal.

As described above, the seal assembly 16 comprises a scraper 22 which is outboard of the seal. The scraper 22 is disposed between the screw 6 and the nut 4 and may be located in the space 7 formed by the recessed portion 5 of the nut (e.g., with the seal 18). The scraper 22 is directly adjacent and may contact the seal 18, for example the scraper 22 may contact the casing 34. The scraper 22 may be a generally cylindrical element arranged about the axis X. The scraper 22 comprises one or more slots 25 (shown schematically in FIG. 1) which extend from an outboard end of the scraper 22 to an inboard end, and which are angled relative to the axis X, such that an inboard end 27 of the slot 25 is radially outwards of an outboard end 29 of the slot 25. In an embodiment, the scraper may contain a plurality of slots 25, for example at least 2, 3, 4 or 5 slots 25.

Figure 2:
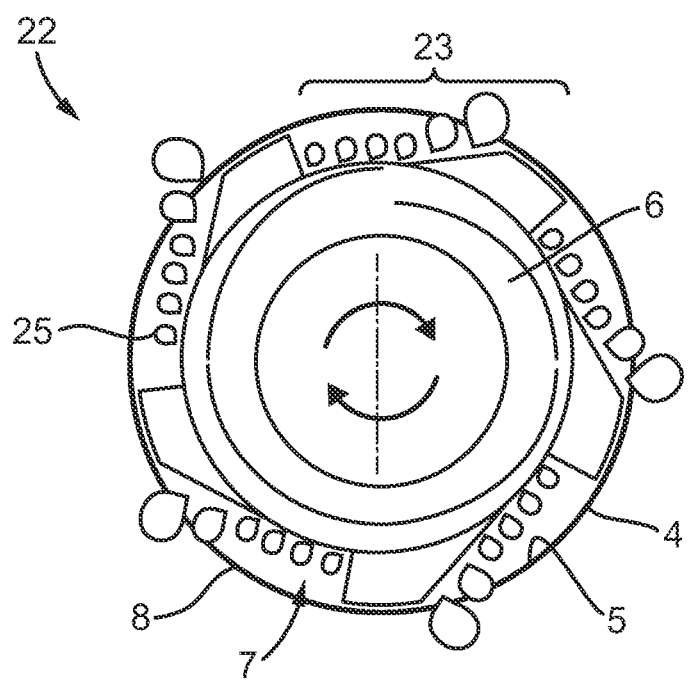
FIG. 2 shows a partial section view along the line A-A of FIG. 1.

FIG. 2 shows a sectional view through the scraper 22 along the line A-A. As is indicated, the slots 25 may extend at least partially about a circumference of the scraper 22 as the slots 25 progress from their outboard 29 to inboard 27 ends. In this manner the slots 25 follow a generally helical path as one moves axially from their outboard 29 to inboard 27 ends. As the slots 25 progress radially outward from their outboard 29 to inboard 27 ends as well, the helical path radially expands along the axial length of the scraper 22.

Referring to both FIGS. 1 and 2, as the screw 6 rotates relative to the scraper 22, the one or more slots each receive or collect water at their outboard end 29. The water is progressed through the slots, pushed by the relative rotation of the screw 6 and the shape of the slots 22, before reaching the inboard end 27 and being expelled radially outwards from the scraper 22. The nut 4 may comprise a passage 36 with an entrance formed through a radially inner wall 8 of the recessed portion 5, to allow the expelled water to be removed from the ballscrew assembly 2. While only one passage 36 is shown, it will be appreciated that there may be multiple passages 36 formed in the nut 4. The scraper 22 may be arranged so that the inboard ends 27 of the slots align with one or more of the passages 36 intermittently during rotation. The water which has progressed to the inboard end 27 can then be expelled from the scraper 22 into the passages 36, then subsequently transported through the passages 36 and out of the ballscrew assembly 2.

The scraper 22 thereby removes water from the ballscrew assembly 2 before it reaches the seal 18, improving the performance of the seal assembly 16. This is particularly useful upon retracting of the ballscrew, since the water can be removed prior to contacting the seal 18 and potentially entering the ballscrew and undesirably interacting with the balls thereof. As the screw 6 rotates the slots 25 may be configured to lift and guide water out of the helical grooves 12 of the screw 6 and towards the one or more passages 36.

In some embodiments, the body 26 of the seal 18 comprises a third section, or lip, 38. The third section 38 is axially adjacent the first section 28 and contiguous therewith, being formed of the same material. The third section 38 is at an outboard side of the seal 18, and may be located axially between the first section 28 and the scraper 22. The third section 38 forms a lip which extends around and past (radially inward of) the layer 32, so as to contact a relatively small portion of the helical groove 12 of the screw 6 directly (that is, relative to the larger contact area between the layer 32 and the screw). The lip 38 may contact the helical groove 12 along less than half of the axial pitch, or extent, of the groove 12, for example less than a third of the axial pitch of the groove. The third section 38 may extend axially by less than about 15%, 10% or even 5% of the axial length of the elastomer 26.

While the scraper 22 acts to remove the majority of the water 22, some water may not be expelled. The third section or lip 38 of the body 26 acts as a wiper on the screw 6 to wipe off the water which is not initially removed by the scraper 22, and also to provide additional sealing against the screw 6. The friction between the resilient material of the third section 38 and the screw 6 provides effective removal of leftover water from the screw 6, while the limited contact along the axial pitch of the helical groove 12 by the third section 38 minimises the contact area and the consequent friction generated, so as to prevent substantial binding of the ballscrew assembly 2. Although the lip 38 is not essential to the broadest aspect of the disclosure, when combined with the seal 18 and scraper 22 it is considered to be an optimum balance between sealing and friction. That is, the clearance between the seal 18 and the screw 6 can still be substantially eliminated (to provide improved sealing and low friction, as discussed above), whilst still providing a small area of direct contact between the elastomeric or compliant material of the body 26 to substantially reduce water ingress further.

As noted above the ballscrew assembly 2 could be used in an actuator in aerospace applications, for example as in a linear actuator of an aircraft engine thrust reverser. Thrust reverser actuators are required to operate reliably, while having low mass and low maintenance intervals. Additionally, components in aerospace applications are prone to adverse environmental conditions which result in water ingress, which the presently disclosed technology is optimised to reduce whilst maintaining low friction and improved sealing, as discussed above.

It will be understood that the above description is of non-limiting embodiments of the disclosure. Changes and modifications can be made thereto without departing from the scope of the disclosure which is defined by the following claims.

The invention claimed is:

1. A ballscrew assembly comprising:
a nut having a first helical groove formed on a radially inner surface and defining an axis (X);
a screw disposed along the axis (X) and within the nut, the screw comprising a second helical groove formed on a radially outer surface and opposed to the first helical groove so as to form a helical raceway;
a plurality of balls disposed in the helical raceway;
an annular seal disposed radially between the nut and the screw, the annular seal comprising:
a resilient body; and
a layer formed of PTFE and disposed radially between the resilient body and the screw and configured to contact the radially outer surface of the screw; and
an annular scraper disposed axially adjacent to the annular seal, the annular scraper comprising one or more slots angled relative to the axis X, the annular scraper configured to receive fluid at an outboard end and expel fluid at an inboard end, wherein the nut further comprises one or more passages having an opening at the radially inner surface, the annular scraper arranged adjacent to the opening and configured such that fluid guided from the second helical groove by the slots enters the one or more passages to be expelled from the ballscrew assembly.

2. The ballscrew assembly of claim 1, wherein the resilient body is formed of an elastomeric and/or compliant material.

3. The ballscrew assembly of claim 1, further comprising a casing positioned between the resilient body and the nut, wherein the casing is formed from a different material to the resilient body.

4. The ballscrew assembly of claim 3, wherein the casing is formed of stainless steel.

5. The ballscrew assembly of claim 1, wherein the annular seal further comprises a lip which directly contacts the screw at the second helical groove.

6. The ballscrew assembly of claim 5, wherein the lip is contiguous with the resilient body.

7. The ballscrew assembly of claim 5, wherein the lip contacts the helical groove along less than half of an axial pitch of the groove.

8. The ballscrew assembly of claim 5, wherein the lip contacts the helical groove along less than a third of an axial pitch of the groove.

9. The ballscrew assembly of claim 1, wherein the slots form a generally helical shape.

10. An actuator for an aircraft engine thrust reverser, the actuator comprising the ballscrew assembly of claim 1.

11. An aircraft engine comprising:
a thrust reverser, the thrust reverser comprising:
an actuator, the actuator comprising the ballscrew assembly of claim 1.

12. A seal assembly for a ballscrew assembly, the seal assembly comprising:
an annular seal defining an axis, the annular seal comprising:
a resilient body;
a layer formed of PTFE and disposed on one side of the resilient body;
a casing disposed on an opposing side of the resilient body to the layer, wherein the casing is formed from a different material to the resilient body; and
an annular scraper disposed axially adjacent to the annular seal, the annular scraper configured to receive fluid at an outboard end and expel fluid at an inboard end, the annular scraper comprising one or more slots angled relative to the axis.

13. A method of manufacturing the seal assembly of claim 12, the method comprising:
molding the layer on the resilient body;
press fitting the resilient body into the casing; and
providing the annular scraper; and positioning the annular scraper adjacent to the resilient body or the casing.

* * * * *